(12) United States Patent
Tamilarasan et al.

(10) Patent No.: US 10,110,383 B1
(45) Date of Patent: Oct. 23, 2018

(54) MANAGING EMBEDDED AND REMOTE ENCRYPTION KEYS ON DATA STORAGE SYSTEMS

(71) Applicant: EMC Corporation, Hopkinton, MA (US)

(72) Inventors: Ashok Tamilarasan, Shrewsbury, MA (US); Naizhong Chiu (Qiu), Newton, MA (US); Mahadevan Vasudevan, Farmingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 15/199,689

(22) Filed: Jun. 30, 2016

(51) Int. Cl.
*H04L 29/06* (2006.01)
*G06F 21/00* (2013.01)
*H04L 9/08* (2006.01)

(52) U.S. Cl.
CPC .................. *H04L 9/0894* (2013.01)

(58) Field of Classification Search
CPC ..................................... H04L 9/0894
See application file for complete search history.

(56) References Cited

U.S. PATENT DOCUMENTS

| | | | | |
|---|---|---|---|---|
| 8,407,773 B1* | 3/2013 | Hayter | ............... | H04L 67/16 726/7 |
| 8,499,357 B1* | 7/2013 | Juvekar | ............... | G06F 21/54 380/277 |
| 9,288,042 B1* | 3/2016 | Madhukar | ............. | H04L 63/062 |
| 2005/0044197 A1* | 2/2005 | Lai | .................. | G06Q 10/10 709/223 |
| 2008/0063209 A1* | 3/2008 | Jaquette | ............ | G06F 21/80 380/284 |
| 2009/0110198 A1* | 4/2009 | Garimella | ........... | G06F 21/6209 380/277 |
| 2011/0154047 A1* | 6/2011 | Brown | ................... | G06F 21/00 713/183 |
| 2014/0164776 A1* | 6/2014 | Hook | ................... | H04L 9/14 713/171 |

* cited by examiner

*Primary Examiner* — Lisa C Lewis
(74) *Attorney, Agent, or Firm* — Krishnendu Gupta; John T. Hurley

(57) ABSTRACT

The techniques presented herein provide managing embedded and external key management systems in a data storage system. An embedded encryption key management system is selected. A first unique signature is generated using a time parameter and a randomly generated value. A backup copy of the lockbox is created, wherein access to the backup copy of the lockbox requires providing a minimum number of unique data storage system values. The encryption key management system is switched to external. A second unique signature is generated for use with the local lockbox, wherein the signature generated using a time parameter and a randomly generated value. The encryption key management system is switched back to embedded and a third unique signature is generated for use with the local lockbox, wherein the signature is generated using a time parameter and a randomly generated value.

5 Claims, 6 Drawing Sheets

MANAGING EMBEDDED AND REMOTE ENCRYPTION KEYS ON DATA STORAGE SYSTEMS

BACKGROUND

Technical Field

This application relates generally to efficiently managing and switching embedded and remote keys on encryption supported storage systems.

Description of Related Art

Protecting confidential data (such as medical records, financial records, personal data, social security numbers, credit card numbers, corporate records, intellectual property, etc.) and other sensitive information from theft and/or unauthorized access is becoming increasingly important to businesses, computer users, and government organizations. Confidential data can exist as so-called "data-at-rest", which is data stored on some type of a storage system such as an array or tape), as well as "data in flight," (also referred to as "data in motion" or "data in transit") which includes data as it exists during its transmission or that is temporarily residing in computer memory to be read or updated).

In recent years there have been numerous examples of security breaches involving thefts of both data-at-rest and data in motion from tens of millions of users. Information technology (IT) professionals use various methods to help prevent such data theft. Currently, different techniques are used to protect data in motion as compared with protection of data at rest. For example, secure sockets layers (SSL), virtual private networks (VPNs) and combinations of these are two examples of security technologies that can be fairly effective in protecting and securing data in flight, especially when combined with other methods that protect that data from start to finish, such as message level security and application level security. Data at rest, however, requires different types of protection. Because of data mobility, data storage consolidation, and data replication, a single breach into data at rest can compromise many millions more records than with a single breach of data in flight.

Organizations have many options for securing data-at-rest, including authentication controls, logical separation, physical security, and encryption of information. Although each option has advantages and disadvantages, when extremely large amounts of data are involved, encryption can provide the most workable solution. Encryption of data, as is well known, involves converting data to an unintelligible form called ciphertext, which cannot be read unless a key is used to decrypt the data (in some types of encryption the same key also is used to encrypt the data). Encryption also can be an important way to protect data at rest in other situations, including the electronic and physical movement of data for backup, data recovery, and/or maintenance. In addition, encryption helps to limit exposure to security breaches, so even if someone is able to access the storage media, the data is still protected to prevent unauthorized access to sensitive information on the storage media. Use of encryption also helps address compliance with industry regulations that require encryption, such as the payment card industry Data Security Standard (PCI/DSS), the Sarbanes-Oxley Act, the Gramm-Leach Bliley Act (GLBA), the Health Insurance Portability and Accountability Act (HIPAA), the United Kingdom Data Protection act (UK DPA), the European Union Directive on personal information, (95/46/EC), various state statutes protecting personal information such as California's CA 1798, and the like.

The security provided by any data encryption technology is as good as the encryption credentials used to encrypt the data. If the encryption key is not securely managed the data is at risk of being compromised. Losing or corrupting the key will lead to disastrous consequences resulting in a data unavailable/data loss scenario. Hence it is vitally important to securely store the keys while making them highly available when needed.

Organizations have sometimes been reluctant to deploy conventional encryption of data at rest for various reasons. Some reasons include the complexity of managing many keys, the need to add extra steps to existing processes for data storage (which can be difficult and time consuming, especially if existing management scripts for replication need to be modified), the expense, the time, and (for some implementations), the need to add one or more appliances to a network. Other issues with deployment of encryption include management complexity (the cost and complexity associated with deploying and managing multiple encryption technologies and key manager); scalability across an enterprise (many "point' solutions for encryption do not scale across application types or infrastructure elements) and disruption to service levels (installing encryption technologies and appliances may require a network outage and/or reconfiguration).

SUMMARY OF THE INVENTION

The techniques presented herein provide managing embedded and external key management systems in a data storage system. An embedded encryption key management system is selected. A first unique signature is generated using a time parameter and a randomly generated value. A backup copy of the lockbox is created, wherein access to the backup copy of the lockbox requires providing a minimum number of unique data storage system values. The encryption key management system is switched to external. A second unique signature is generated for use with the local lockbox, wherein the signature generated using a time parameter and a randomly generated value. The encryption key management system is switched back to embedded and a third unique signature is generated for use with the local lockbox, wherein the signature is generated using a time parameter and a randomly generated value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
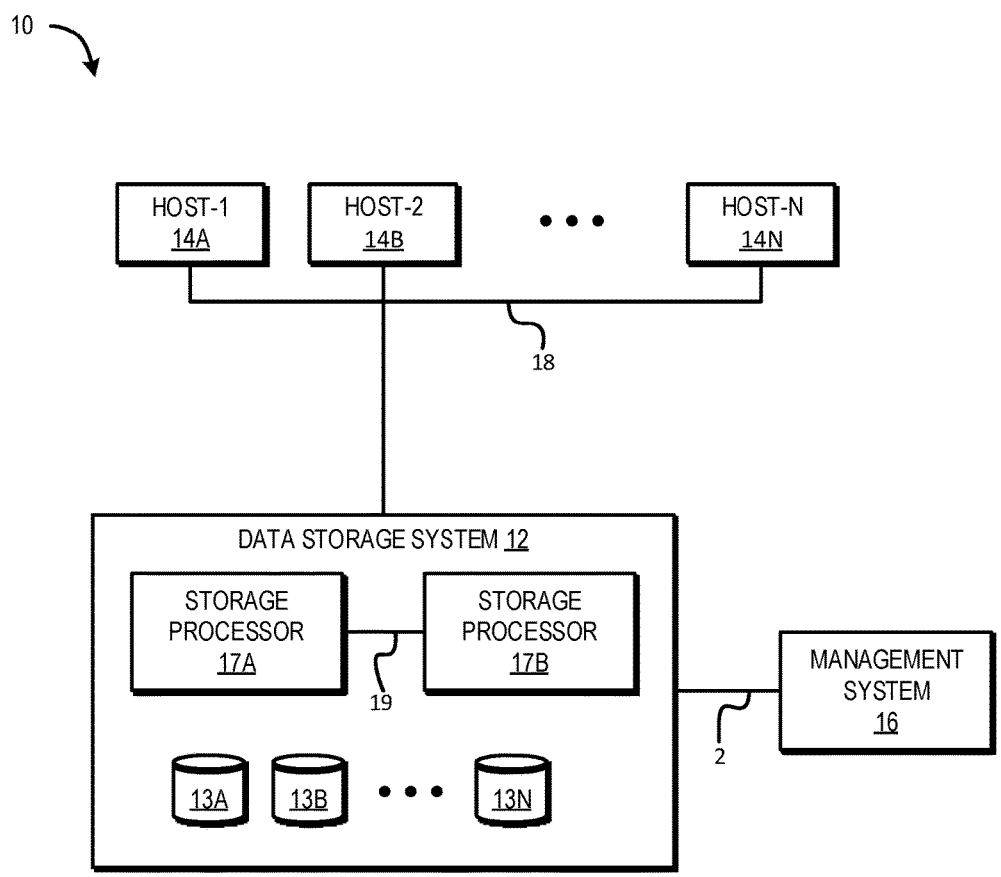
FIG. 1 is an example embodiment of a system that may utilize the techniques described herein.

For data storage systems where encryption keys are used on persistent data, it is critical that copies of these keys are maintained in case of failure of the primary copy of the keys on the storage system. If the keys need be restored from this backup copy, there needs to be a way to verify that the keys being restored are associated with (i.e., originated from) the system they're being restored to. Example embodiments described herein present techniques for providing a unique storage system signature using system stable values (SSV) that may be leveraged such that the lockbox cannot be accessed unless a specific subset of SSVs match. A subset may be used to accommodate situations in which a reasonable number may have changed over time.

Data Security has become one of the biggest challenges today particularly of securing the data at rest in the storage infrastructure and protecting against drive loss and theft. Data-at-rest encryption encrypts data stored on a drive using an encryption key. The encrypted data provides protection against drive theft; however, it does not protect against an intruder getting access to the encryption keys and using them to open a stolen drive. It also does not protect against a scenario where someone steals one or more drives (e.g., the first three drives) where a copy of the key resides along with other drives containing data a user wishes to protect. To prevent against such unauthorized access to data, a two-factor authentication system may be employed, such as those described in U.S. patent application Ser. No. 14/231, 714 entitled ASSOCIATING ENCRYPTION CREDENTIALS WITH HARDWARE RESOURCES, filed Mar. 31, 2014, which is incorporated herein by reference for all purposes.

The first level of access control is enforced by capturing a system fingerprint at the time of the creation of the authentication key and using that with several randomly generated SSVs to control access to a lockbox that stores the encryption keys. Any attempt to use the encryption keys stored in the lockbox to decrypt encrypted data must provide a predetermined minimum number of SSVs in order to access the lockbox. If more than a predetermined number of SSVs has changed, then the keys stored in the lockbox will not be accessible. This prevents a malicious user from removing one or more drives storing encryption data on one data storage array and installing them on another similar data storage array and gaining access to protected data. Because the lockbox controls access to all the encrypted data, it is important to make a backup copy in the event it gets corrupted or becomes otherwise unusable. Such backup copies are typically stored off-array. Techniques presented herein provide mechanisms such that the lockbox needs to be recovered using the backup copy, it can be determined that the lockbox backup was generated/derived from the storage system where the recovery is being attempted. Furthermore, given the backup copy may have been created some time ago, the techniques provide a mechanism to handle the situation where some of the SSVs may have changed since the backup was created.

The best place to implement encryption in a computer system, especially a networked or enterprise computer system, can vary depending on the use case and/or the customer. For example, in an enterprise-level computer system, encryption can be provided at the application level, the host or operating system level, within the network, and/or at the level where the physical device resides. Advantageously, the techniques described herein may be implemented almost anywhere in the system's software stack from the hardware level up to a user interface application. For the purposes of discussion, example embodiments described herein illustrate data at rest encryption at the hardware level using self-encrypting drives; however, this should be construed as a limitation, and the techniques may be applied to various different level in the software stack.

At the hardware level, self-encrypting drives may be implemented in conjunction with the current techniques. A self-encrypting drive is a self-encrypting hard drive with circuitry built into the disk drive controller chip that encrypts and decrypts all data to and from the magnetic media on the fly. Self-encrypting drives encrypt all the time performing like any other hard drive with the encryption being completely transparent to the user. The contents of a self-encrypting drive, including the encryption keys stored thereon, always remain encrypted and are protected by hardware that cannot be accessed by other parts of the system. Because disk encryption is handled in the drive, overall system performance is not affected and is not subject to attacks targeting other components of the system.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
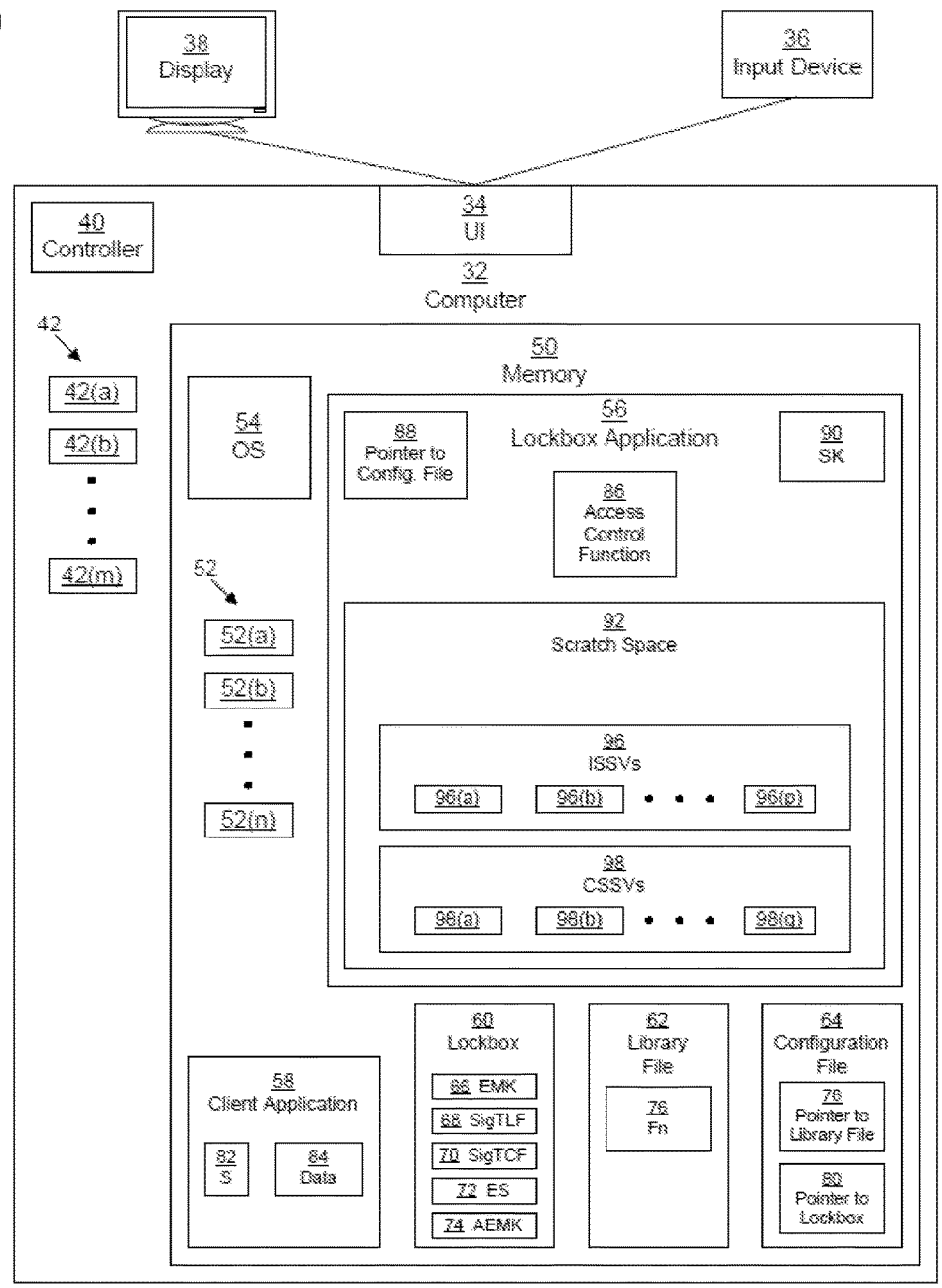
FIG. 2 is a diagram illustrating in more detail components of FIG. 1 that may utilize the techniques described herein.

FIG. 2 depicts a computer system 30 for use in practicing various embodiments. Computer system 30 includes a computer 32 having a user interface (UI) 34 connected to one or more input devices 36 (such as, for example, a mouse, keyboard, tracking pad, trackball, touch-screen, tablet, keypad, etc.) and an output device such as display 38 (such as, for example, a computer monitor or an embedded display screen). Computer 32 further includes a controller 40 (such as, for example, a general-purpose microprocessor, a processor, a central processing unit, dedicated circuitry, etc.), a set of stable hardware values 42 (including stable hardware values 42(a), 42(b), . . . , 42(m)) stored in memory 50. Memory 50 may include one or more of the following: random access memory (RAM), ROM, system memory, volatile memory, non-volatile memory, static RAM, flash memory, non-volatile data storage, optical storage, electromagnetic storage, floppy disk, hard disk, CD-ROM, DVD-ROM, Blu-ray, etc. Memory 50 stores, inter alia, a set of stable software values 52 (including stable software values 52(a), 52(b), . . . , 52(n)) (such as, for example, serial numbers of the operating system and various other pieces of installed software, parameters stored by the operating system and various other pieces of installed software, etc.), operating system (OS) 54, lockbox application 56, one or more client applications 58, lockbox file 60, library file 62, and configuration file 64.

Lockbox file 60 is a file that securely stores information on behalf of client applications 58, accessible through lockbox application 56. In some embodiments, lockbox file 60 stores data as a set of name-value pairs, the names representing the meaning of the contents of their respective values. The names may be encrypted for further security. The values are also encrypted, as described in further detail below. In some embodiments, lockbox file 60 may be stored in system memory (or another volatile and temporary storage medium), while in other embodiments, lockbox file 60 may be stored on a hard disk (or another permanent or semi-permanent non-volatile storage medium).

Library file 62 may be, for example, a dynamic-link library (DLL) that stores one or more functions callable by software applications. In particular, library file 62 stores a callback function (Fn) 76, which is operable to return the values of a pre-defined set of stable system values (SSVs) read from the computer 32, drawn from the set of stable hardware values 42 and the set of stable software values 52. This callback function 76 may be provided by the client application 58 to provide application-specific security. In some embodiments, library file 62 may store a plurality of callback functions 76, each one associated with a different client application 58. In other embodiments, multiple library files 62 may exist, each one storing a callback function 76 associated with a different client application 58.

Configuration file 64 is a file which stores various configuration data for the lockbox application 56. In one embodiment, configuration file 64 may be written in a markup language (such as, for example, the eXtensible Markup Language or XML). In particular, configuration file 64 may store a pointer 78 to the library file 62 (pointing either to a memory address or to a file path and name) as well as a pointer 80 to the lockbox file 60 (pointing either to a memory address or to a file path and name). In some embodiments, multiple lockbox files 60 are used, in association with multiple client applications 58, and a mapping between client applications 58 and pointers 80 to respective lockbox files 60 is stored as well. Configuration file 64 may also store function headers for functions stored in various library files 62, such as for callback function 76.

Client application 58 may be any application that can make use of securely stored data through lockbox application 56. For example, client application 58 may be an encrypted storage application. As an additional example, client application 58 may be a web browser that is configured to persistently and securely store user passwords for a variety of websites. Client application 58 manages a secret (S) 82. In one embodiment, secret 82 may be an application-specific encryption key for encrypting application-specific data 84 (for example, application-specific data 84 may be the contents of a storage device, or it may be user passwords for websites). In another embodiment, secret 82 may be the application-specific data 84 itself, the client application 58 relying on the lockbox 60 to securely store the application-specific data 84 rather than merely using the lockbox 60 to store the client-specific encryption key with which the client-application 58 encrypts the application-specific data 84.

Lockbox application 56 includes an access control function 86, a pointer 88 to configuration file 64 (pointing either to a memory address or to a file path and name), a secret key (SK) 90, and scratch space 92. In operation, computer system 30 may be initialized and configured to securely store secret 82 in lockbox file 60 as well as to securely access secret 82. Preliminarily, it should be noted that anytime a piece of software, such as lockbox application 56, is mentioned as performing an action, in fact, controller 40 actually performs the action while running the software.

In general, as part of an initialization process, lockbox application 56 (A) calculates and stores a signature 68 of a trusted library file 62 containing a trusted function 76 usable to generate stable system values (SSVs) of the computer, and (B) calculates and stores a first value based on an initial set of SSVs 96 generated by the trusted function 76, the first value and a second value to be used by an access control function 86 to enable access to a stored secret 82. In other embodiments, the first value may be any value generated from the initial set of SSVs 96.

As part of a use process, computer lockbox application 56 (A) calculates a signature SigLF of a loaded library file 62 containing an untrusted function 76 used to generate a current set of SSVs 98 upon which the second value is to be calculated, (B) compares the respective signatures of the trusted library file SigTLF 68 and the loaded library file SigLF to generate a comparison result signal, and (C) only when the comparison result signal indicates a successful comparison, permit an access-granting output of the access control function 86 to enable the access to the stored secret. In embodiments in which the first value is any value generated from the initial set of SSVs 96, the second value may be another value generated from the current set of SSVs 98 such that if the current set of SSVs 98 and the initial set of SSVs 96 are the same (or sufficiently close), lockbox application 56 is able to determine that the lockbox 60 may be opened.

Figure 3:
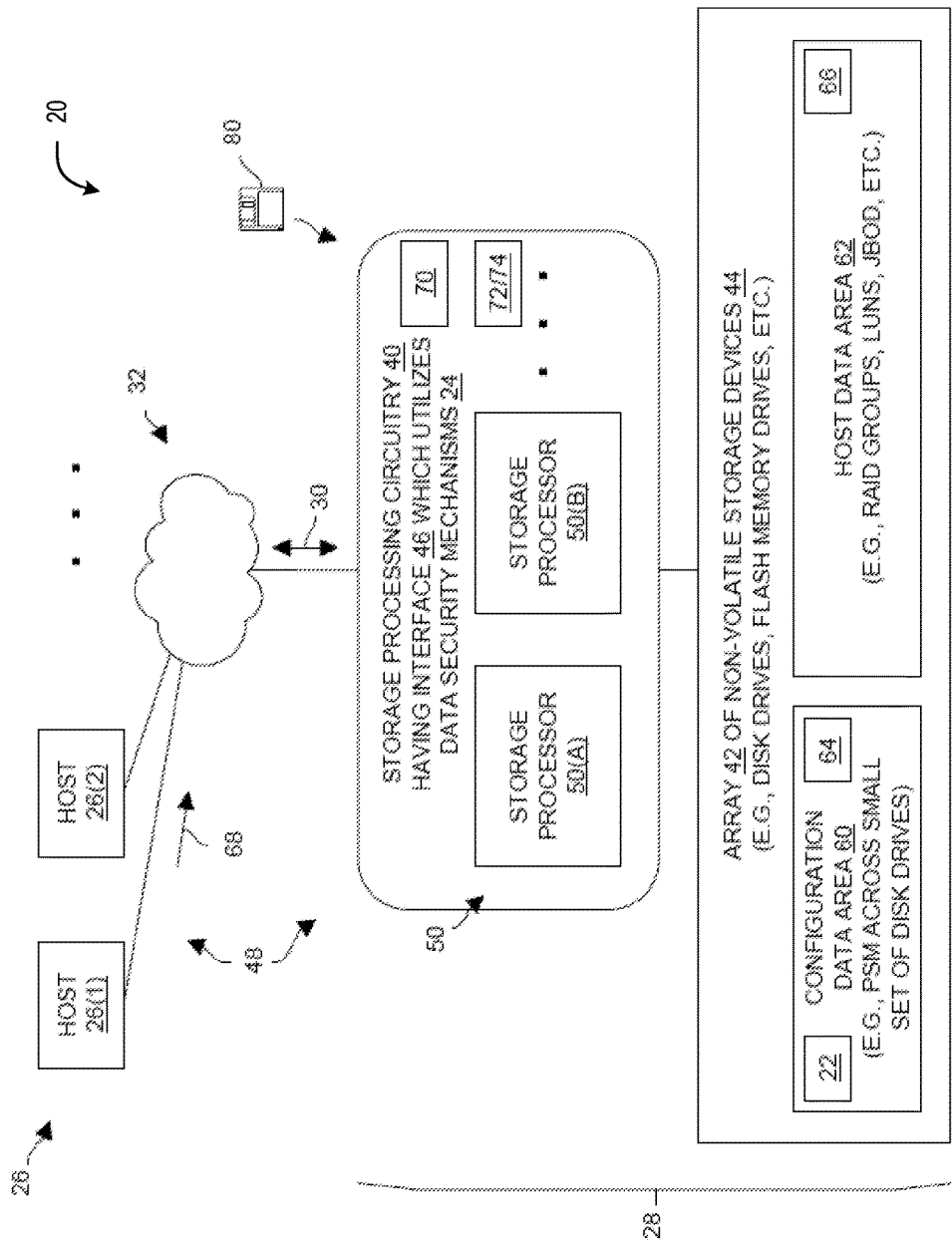
FIG. 3 is a diagram illustrating in more detail components of FIG. 1 that may utilize the techniques described herein.

FIG. 3 depicts a data storage system 20 which provides secure access to credentials 22 using data security mechanisms 24. The data storage system 20 includes a set of hosts 26(1), 26(2), . . . (collectively, hosts 26) and a data storage assembly 28. The hosts 26 communicate with the data storage assembly 28 by exchanging electronic signals 30 (e.g., fiber optic signals, electrical signals, wireless signals, combinations thereof, etc.) over a communications medium 32 (e.g., a storage fabric, a computerized network, combinations thereof, etc.) with connects the hosts 26 and the data storage assembly 28 together.

The data storage assembly 28 includes storage processing circuitry 40 and an array 42 of non-volatile storage devices 44. The storage processing circuitry 40 is constructed and arranged to provide an interface 46 which creates and utilizes the data security mechanisms 24 to secure and protect the credentials 22 on behalf of various applications 48 running within the system 20. In some arrangements, the storage processing circuitry 40 includes multiple storage processors 50(A), 50(B), . . . (collectively, storage processors 50). Each storage processor 50 is capable of being replaced during the lifetime of the data storage system 20.

The interface 46 initially creates and configures the data security mechanisms 24 to provide secure storage for the applications 48. This activity will be described in further detail shortly. Although an application 48 will typically access a respective data security mechanism 24, it is possible for multiple applications 48 to share access to a single data security mechanism 24. The applications 48 may run in the hosts 26, in the user space of the storage processors 50, or in both.

As further shown in FIG. 3, the array 42 of non-volatile storage devices 44 provides a configuration data area 60 and a host data area 62. The storage processing circuitry 40 writes system configuration data 64 into and reads system configuration data 64 from the configuration data area 60 when carrying out certain operations such as when making changes to the data storage system 20 and when reporting certain status to a user application. The configuration data 64 preferably includes, among other things, configuration information required for proper operation of the data storage system 20 (e.g., hostnames, LUN or volume information, username and password information, virtual machine configuration information, and so on). An example of the configuration data area 60 is storage allocated for a persistent storage manager module (PSM) of the data storage system 20.

Additionally, during array operation, the storage processing circuitry 40 writes host data 66 into and reads host data 66 from the host data area 62 on behalf of the hosts 26. Such operations occur in response to data storage requests 68 from the hosts 26.

It should be understood that both the configuration data area 60 and the host data area 62 are allocated storage areas which are preferably formed by multiple storage devices 44 (e.g., disk drives, flash memory drives, etc.) running a fault tolerant protocol. Along these lines, the storage devices 44 can be organized as just a bunch of disks (JBOD), volumes, LUNs, RAID groups (e.g., RAID 0, RAID 1, RAID 5, etc.), and so on which are capable of protecting data against various types of failures. For example, in some arrangements, the configuration data area 60 redundantly resides on a small set of disk drives (e.g., four disk drives running a RAID protocol) which are designated for holding PSM data. Similarly, other storage devices 44 can be grouped and arranged to effectively and efficiently hold the host data area 62. Each storage device 44 of the array 42 is capable of being replaced (e.g., hot swapped) during the lifetime of the data storage system 20.

As mentioned earlier, the interface 46 creates a data security mechanism 24 and then stores credentials 22 of an application 48 securely within the data security mechanism 24 on behalf of the application 48. To store the credentials 22 within the data security mechanism 24 and subsequently retrieve the credentials 22 from the data security mechanism 24, the interface 46 provides a set of standard library of routines, function calls, procedures, etc. which can be invoked by the application 48. In some implementations, the interface 46 provides an application programming interface (API) and the application 48 stores a credential 22 by passing it to the interface 46 which then, in combination with the data security mechanism 24, handles encryption/decryption, guarding of encryption keys, and direction of credential storage to the configuration data area 60 of the array 42 in a manner that is transparent to the application 48.

To initially create and configure the data security mechanism 24 to provide secure storage for an application 48, the interface 46 obtains a unique identifier 70 and a set of stable values 72. In some arrangements, the unique identifier 70 is a hostname of the particular host 26 running the application 48 when the hostname is unique to the data storage system 20. The hostname is obtainable from the configuration data area 60 which stores the configuration data of the data storage system 20. In some arrangements, the set of stable values 72 are machine-generated codes from a code generator 74 which are random to users of the system 20.

The set of stable values 72 is preferably generated by a code generator 74 of the storage processing circuitry 40 (e.g., a separate application/module running on the storage processing circuitry 40). In some arrangements, each stable value 72 is randomly generated and has a minimum length of 8 characters (64 bits) and a maximum length of 255 characters (2040 bits). In some arrangements, each stable value 72 contains at least one lower case character, one upper case character, one digit and one special character for added security.

Once the interface 46 receives the unique identifier 70 and the set of stable values 72, the interface 46 creates the data security mechanism 24 and configures the data security mechanism 24 to allow access to secure storage using a system fingerprint. The system fingerprint is based on both the unique identifier 70 and the set of stable values 72, e.g., a combination of the unique identifier 70 and the set of stable values 72.

It should be understood that the operations of (i) obtaining the unique identifier 70 and the set of stable values 72, (ii) creating the data security mechanism 24, and (iii) configuring the data security mechanism 24 to use the system fingerprint, are preferably performed in a manner which is transparent to the application 48. In particular, the interface 46 is able to acquire, as the unique identifier 70, the hostname of the host 26 running the application 48 from the configuration data stored in the configuration data area 30. Additionally, the interface 46 is able to acquire and save, as the set of stable values 72, machine-generated codes. The interface 46 is able to carry out these activities independently without assistance from the application 48. Once the data security mechanism 24 is created and configured, the interface 46 is capable of receiving the credentials 22 from the application 48 and storing the credentials 22 in encrypted form as a set of files within the configuration data area 60 of the array 42. Accordingly, the credentials 22 enjoy the same safeguarding as other configuration data 64 of the system 20.

When the application 48 requires subsequent access to the credentials 22 (e.g., during a user login operation), the interface 46 obtains the unique identifier 70 and the set of stable values 72 in real time, and delivers this information to the data security mechanism 24. The data security mechanism 24 dynamically generates a current fingerprint and compares the current fingerprint to the earlier-created system fingerprint. Only if the current fingerprint matches the system fingerprint does the data security mechanism 24 decrypt the credentials 22 and provide the decrypted credentials 22 to the application 48 through the interface 46.

The interface 46 initially creates and configures a data security mechanism 24 for an application 48 and then operates as a conduit which enables that application 48 to subsequently access the credentials 22 stored within the data security mechanism 24 (e.g., the interface 46 provides wrapper and callback functions to the data security mechanism 24). To this end, the data security mechanism 24 includes an executable portion which runs within the storage processing circuitry 40 and a storage portion which resides within the configuration data area 60 (e.g., within the PSM). Once the data security mechanism 24 is created, the data security mechanism 24 uses keys for encryption and decryption. These keys are unique and random from a user's perspective and are automatically managed by the data security mechanism 24. It should be understood that the data security mechanism 24 may employ certain features from standard lockbox modules/files such as cryptographic keys, passwords, and configuration data as described elsewhere herein.

In some arrangements, the data security mechanism 24 further includes in-memory storage within the storage processing circuitry 40 (i.e., local semiconductor memory). In these arrangements, the credentials 22 always remain in encrypted form while the credentials 22 of the application 48 reside in the configuration data area 60. The credentials 22 are decrypted only after a copy of the credentials 22 is moved into the in-memory storage within the storage processing circuitry 40. Such operation by the interface 46 enables the reduction of frequent input/output (I/O) operations to the configuration data area 60 (i.e., a large number of reads of the configuration data area 60 in a short period of time) since access can be restricted at least temporarily to the local, in-memory copy of the credentials 22.

An example of an application 48 which benefits from the secure handling of credentials 22 in the manner described above is a service role tool application which provides a set of service accounts requiring user logins which use usernames and passwords. Another example of such an application 48 is a graphical user interface (GUI) (i.e., a system management application) which displays particular views of virtual machine information of the data storage system 20 such as information regarding ESX servers offered by VMWare of Palo Alto, Calif. Other application examples include upgrade routines and procedures, new storage processor routines, and the like. For such applications 48, the interface 46 directs the data security mechanisms 24 to maintain their credentials 22 (e.g., usernames and passwords, virtual machine configuration information) in encrypted form within the configuration data area 60 of the array 42. As a result, the applications 60 are able to store their credentials 22 securely within the data security mechanisms 24 through the interface 46.

It should be understood that the set of stable values 72 is preferably stored in a secure and safe manner outside the data security mechanism 24. In some arrangements, the interface 46 stores the set of stable values 72 on behalf of the application 48 as configuration data 64 in the configuration data area 60 of the array 42 but separately from the data security mechanism 24. As a result, any part of the data storage system 20 can be lost and replaced with the exception of the configuration data area 60, and the application 48 will be able to maintain access to the credentials 22. For example, the hardware of the host 26 can be replaced with new hardware which is given the same hostname. As another example, the storage processing circuitry 40 can be replaced with new storage processing circuitry 40. Moreover, any of the storage devices 44 can be replaced (even one or more disks forming the configuration data area 60) as long as coherency of the configuration data area 60 is preserved. In all of these situations, the interface 46 is capable of dynamically generating a current fingerprint from the unique identifier 70 and the set of stable value 72, and then gaining access to the credentials 22 which are securely stored in the configuration data area 60.

It should be further understood that the interface 46 is capable of being delivered to and installed in the storage processing circuitry 40 from a computer program product 80 (illustrated generally by a diskette icon 80). Such a computer program product 80 includes a computer readable storage medium which stores instructions that are executed by the storage processing circuitry 40. Examples of suitable computer readable storage media include CD-ROM, flash memory, disk memory, tape memory, and so on.

However, the data Security provided by encryption is only as good as the generation, protection and management of the authentication key used to encrypt the DEK. The AK must be available when needed but at the same time access to the keys must be tightly controlled. The life cycle of the AK must be managed as the key is must be preserved for the life time of the data. Loss or corruption of the AK will lead to a DU/DL.

In order to protect and securely manage the lifecycle of the key encryption key the Data-at-Rest Encryption feature incorporates an Embedded Key Manager (EKM). The Key Manager is responsible for generation, secure storage, retrieval, backup and restore of the authentication key. The key lifecycle is self-managed and is not exposed to the user. The only user action permitted on the key is to backup it up and restore if needed. The encryption credentials are stored securely in an encrypted store in a triple mirrored partition and needs known values associated with the hardware at the time of the key creation to access the key. The key manager uses a mini-RAID engine to verify, rebuild and maintain consistency of the three copies. The key manager also handles drive errors and drive insertion or removal scenarios to rebuild the key for those drives. The key copies are synced during every transition of the key state.

Figure 4:
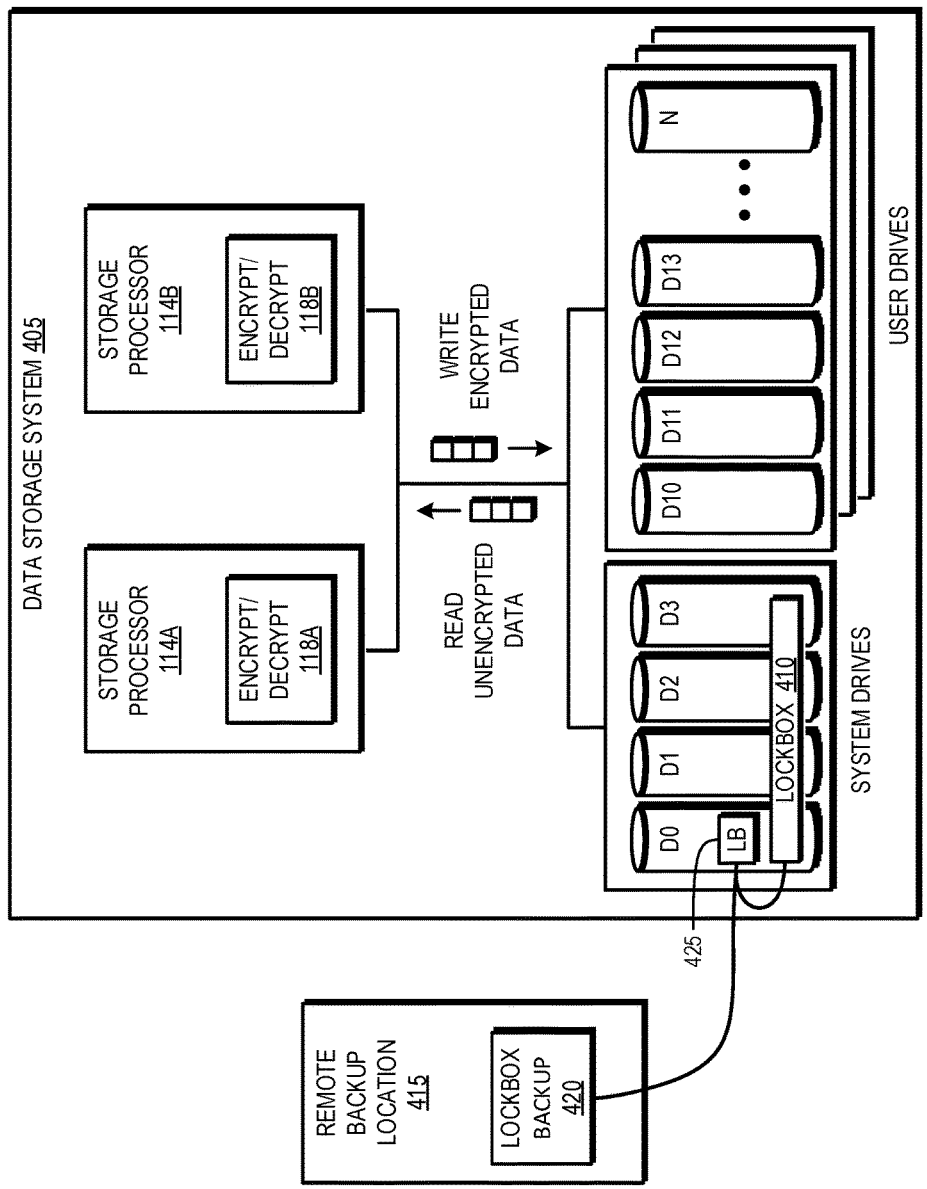
FIG. 4 is a diagram illustrating in more detail components of FIG. 1 that may utilize the techniques described herein.

FIG. 4 is a block diagram illustrating an example embodiment for use in implementing techniques described herein for associating a data encryption lockbox backup with a data storage system. Example embodiments may include a data storage system 405 having two or more storage processors 114A, 114B, directly or indirectly, communicatively coupled to each other and to multiple storage drives D0-DN and may be arranged as one or more RAID groups and/or storage pools in a manner similar as described elsewhere herein. A first storage processor 114A may include an encryption/decryption module 118A. A second storage processor 114B (also referred to as a "peer" processor) may include a second encryption/decryption module 118B.

The encryption/decryption modules 118A, 118B are hardware modules configured to perform the encryption/decryption operations in hardware as opposed to software methods, and, therefore, are capable of executing the encryption/decryption operations at virtually line speed. In normal operation, data written to storage drives D0-DN is encrypted and data read from the storage drives D0-DN is decrypted.

The data storage system 405 may also include a lockbox 410 providing some or all of the functionality and features as described elsewhere herein and may be stored on one or more storage drives, such as system drives D0-D3 in a secure and protected manner. The data storage system 405 may be in communication directly or indirectly with a remote backup location 410 configured to store one or more backup copies of the lockbox 420. The remote backup location 415 may be logically remote from the data storage system or physically remote on a different system, network, media and/or physical/geographical location.

The lockbox 410 may be protected such that a secret or secrets may be required to be provided in order to access the contents of the lockbox to obtain contents such as encryption keys for storage drives D0-DN. Employing techniques described herein, the secrets may be associated with a particular data storage system. Further, the lockbox may be securely backed up and restored in a remote location while ensuring any attempt to restore the lockbox is allowed only on the data storage system where the lockbox was originally generated.

A first set of SSV are generated for the data storage system 405. SSV values are chosen such that they uniquely identify the particular storage array on which they were generated. An SSV may include a number of different values associated with a particular storage array's hardware and software components. The SSV may be stored in a private space on the data storage system's 405 system drives D0-D3 and may be encrypted as well. The SSV may also be store in the lockbox.

The hardware SSV may be values associated with particular hardware residing in the data storage system capable of uniquely identifying the data storage system 405. The particular hardware may be selected to include hardware based on the likelihood of it changing. Examples may include sub-systems, individual sub-system components, power supplies, and the like. Alternatively, or in addition, the values may be stored persistently in memory or may be derived on-the-fly by executing one or more systems commands to generate a set of SSV.

Software SSV may be derived using a random number generator or similar method such that unique values are derived. Alternatively, or in addition, a user may be allowed to select/provide one of the random software SSV values. In this case, a user could provide a password or other secret value that would be used as one of the software SSV. This value could be required in addition to some minimum number of values for each subset of the hardware and software SSV.

The software SSV and the hardware SSV may be combined to create a complete set of SSV. A complete SSV includes a total number of values equal to the number of hardware SSV and the number of software SSV. The ratio of hardware to software SSV is an implementation detail and need not be equal, that is, there may be more software SSV than hardware SSV, or more hardware SSV than software SSV, or an equal number (if an even number of total values is implemented). In one example embodiment, the techniques may provide for processing 10 total SSV, comprising a subset of software and a subset of hardware values. For example, 4 hardware SSV may be used and 6 software SSV may be used. Other number and combinations may be similarly utilized and may further be statically fixed or by dynamically controlled by the storage system.

As a result, the lockbox 410 may be encrypted, password protected, and 'tied,' i.e., associated with a particular data storage system 405, since the SSV 430 is derived from a unique combination of hardware and software components corresponding to that particular data storage system 405. The SSV is in turn used to open the lockbox 410 to obtain storage drive D0-DN encryption keys for encrypting data stored thereon.

The lockbox 410 may be created and configured to store a first set of SSV, the storage drive D0-DN encryption keys, and the like. Access to the lockbox 410 may require providing a complete set of SSV, or a subset thereof where the actual number of SSV required may be stored in a first match value. A local backup copy 425 of the lockbox 410 may be created and stored on a system drive such as D0 or the like. The local lockbox backup 425 may be modified using an administrator mode to change the number of matching SSV required to gain access to the lockbox backup where the actual number of SSV required may be stored in a second match value. Thus, the number of SSV required to open the lockbox 410 and the lockbox backup 425 may be the same or adjusted as desired. These values may static or optionally be adjusted based on user and/or system software changes.

The backup copy 425 of the lockbox may be stored at a physically or logically remote location 415, where, in the event the data storage system lockbox 410 becomes corrupted or otherwise unavailable, the lockbox backup 420 can be restored to the data storage system. However, advantageously, the lockbox backup 420 can only be restored to the data storage system on which the lockbox was originally created. Such protections prevent a malicious user accessing data on storage drives should the malicious user steal storage drives and the lockbox backup and try to attempt to obtain the drives' encryption keys by restoring the lockbox on a different storage array. Because the SSV do not match, the restore procedure will be terminated and access to the drives' data will be prevented.

The restore process may begin by downloading the lockbox backup 420 located at the remote backup location 415 to the data storage system 12 and be stored on a system drive D0 as lockbox backup ("LB") 425. A second set of SSV may be generated by obtaining SSV for the data storage system's current configuration. The second set of SSV may then be compared to the SSV stored in the lockbox backup 425 to determine how many lockbox backup 425 SSV match the current storage system's SSV. If the number of matching SSV is less than the second match value (i.e., the match value associated with the lockbox backup 425), the restore process can be terminated. However, if the number of matching SSV is sufficient based on the predetermined criteria (e.g., equal or greater than the second match value), the restore process may be allowed to continue. The number of required matching SSV can be all or a subset thereof.

After the lockbox backup 425 has been successfully opened, the match value of the lockbox backup 425 can be left as is or changed. For example, the match value can be changed to equal the first match value that was used in the original lockbox 410 (i.e., the lockbox before the restore process was initiated). Alternatively, or in addition, the lockbox may be refreshed. Rekeying may be performed by writing the current storage system 405 SSV (e.g., the second set of SSV) to the lockbox backup 425 such that all the SSV in the lockbox backup 425 match the data storage system's SSV based on the current configuration. At this point, the restore process may restore the lockbox 410 by replacing (e.g., overwriting) the current lockbox 410 with the lockbox backup 425.

In an alternative example embodiment, the system may modify the current lockbox 410 and/or lockbox backup 420 when, for example, a maintenance procedure will result in a hardware and/or software component change that may cause one of the SSV to change. Such a maintenance procedure may generate a notification to a user or system administrator that the lockbox 410 and/or lockbox backup should be updated when the procedure is completed. When updating either or both lockboxes 410 420 a third set of SSV may be generated using the data storage system's configuration after the hardware and/or software changes have been completed. The third set of SSV are then written to the local lockbox 410.

Figure 5:
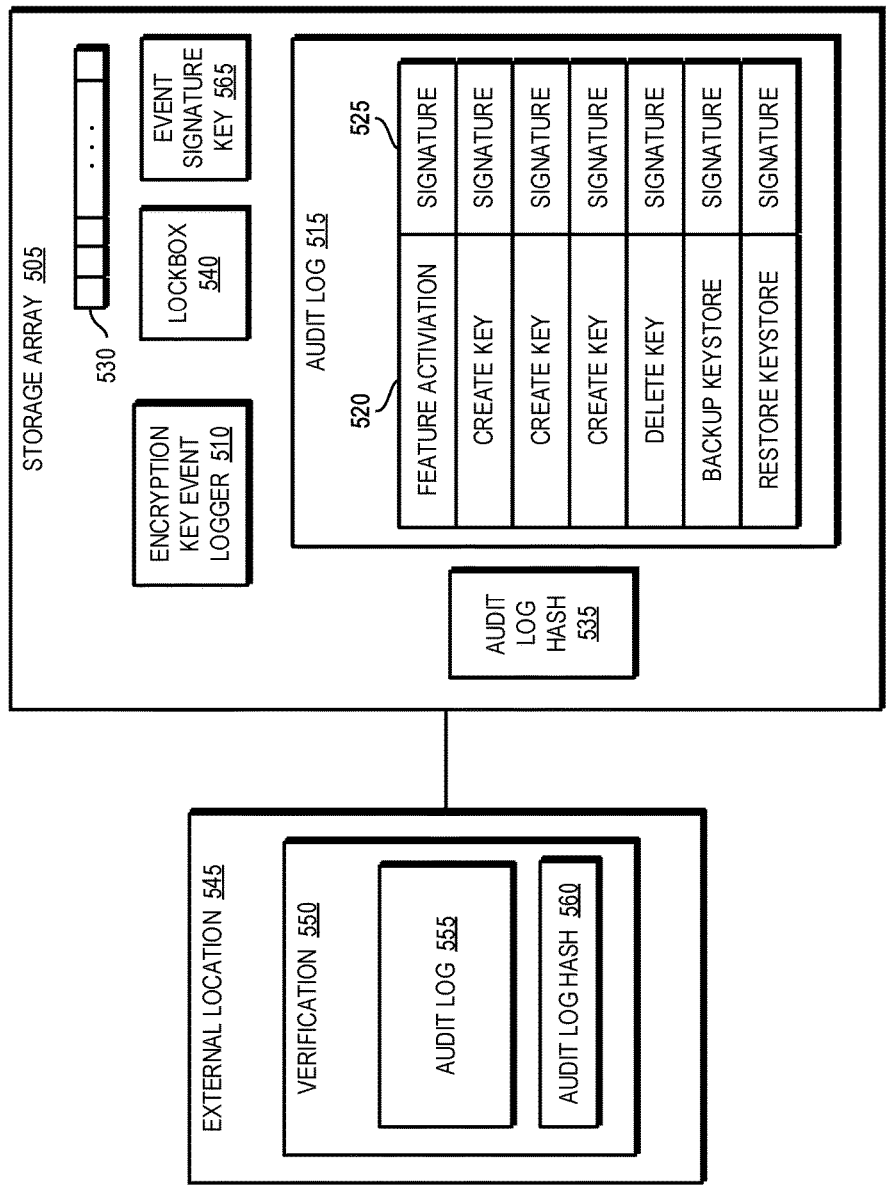
FIG. 5 is a diagram illustrating in more detail components of FIG. 1 that may utilize the techniques described herein.

FIG. 5 is a block diagram illustrating an example embodiment employing techniques described herein for verifying the integrity of an audit log arranged to store encryption key activity associated with self-encrypting drives. Although encryption key audit logs are used for discussion purposes, the techniques described herein should not be construed as being limited thereto and may be applied to other files where auditing and verification functionality is desired.

Drive and other encryption keys may be stored and managed by lockbox 540 in a manner similar as was described above. The storage array 505 may include an encryption key event logger 510 configured to identify and record encryption key activity events and the individual drive corresponding to the event. Encryption key activity events that may be recorded include events such as feature activation, key creation, key deletion, keystore backup, keystore restore operations and the like. An audit log 515 is created, maintained and stored on the storage array 505 and may be sufficiently sized such that it can hold a lifetimes worth of storage array key events. The audit log 515 may be arranged as, for example, a two-dimensional array where a first column includes entries for storing encryption key events 520 and a second column includes entries for storing unique signatures 525 associated with a corresponding encryption key event 520. Other arrangements, data structures and container type may be suitably employed.

In operation, when an encryption key event occurs, the event is identified by the encryption key event logger 510 and appended to the audit log 515 file by recording the event 520 as a new entry. An event signature 525 is created for each key event 520 by hashing the key event with a special event signature key 565 stored in the lockbox 540. The event signature key 565 may be obtained from the lockbox 540 using a secret such as an SSV 530 to gain access to the lockbox 540.

As was described above, SSV values are chosen such that they uniquely identify the particular storage array on which they were generated. An SSV may include a number of different values associated with a particular storage array's hardware and software components.

Software SSVs may be derived using a random number generator or similar method such that unique values are derived and may be stored in a private space on the storage array's 505 system drives and may be encrypted or hashed as well. Hardware SSVs are values associated with particular hardware residing in the storage array capable of uniquely identifying the storage array 505. The particular hardware may be selected to include hardware based on the likelihood of it changing. The software SSVs and the hardware SSVs may be combined to create a complete SSV 530. A complete SSV 530 includes a total number of values equal to the number of hardware SSVs and the number of software SSVs.

As a result, the SSV 530 provides a verification mechanism traceable to a particular storage array 505 since the SSV 530 is derived from a unique combination of hardware and software components corresponding to that particular storage array 505. The SSV 530 is in turn used to open the lockbox 540 to obtain the event signature key 565. The event signature key 565 and key event contents are hashed to create the event signature 525. Thus, the SSV 530 provides the ability to verify that the key events 520 occurred on the storage array 505 from which the SSV 530 was created. In addition, the hash function enables detecting whether the key event entries 520 have been tampered with or otherwise modified. Such features provide the ability for a user to demonstrate that the key events recorded in the audit log 515 were generated on the storage array in question and that the key events have not been tampered with.

A hash may also be created for the audit log file 515 for verification and traceability functionality. For example, an audit log hash 535 may be created by hashing the contents of the audit log 515 (i.e., the key events and corresponding signatures). The audit log hash 535 can be for a subset of entries in the audit log file 515, such as a particular date range, or can be for the entire audit log file 515. Because the audit log hash 535 is based on the contents of the audit log 515 which is verifiable and traceable to a particular storage array, the audit log hash 535 is similarly verifiable and traceable to a particular storage array and whether it has been tampered with or not.

Verification of the audit log may be performed off-array at an external location 545. For example, a verification module 550 may be configured to retrieve a copy of the audit log 555 for verification. The external location 545, such as a management system 16 or other such system may be in communication with the storage array 505. The audit log 555 may be retrieve by, for example, executing a command via a GUI, command line interface (CLI), browser or the like. The audit log 555 may be simultaneously retrieved together with a copy of the audit log hash file 560.

Alternatively, or in addition, the audit log hash file 560 may be generated on-the-fly from the original audit log 515 by issuing a command directed to the storage array 505 instructing the storage array 505 to create an audit log hash 535 for a particular range of key events. The range can be, for example, a particular date range or can be the entire file. Such a feature may be useful when the copy of the audit log hash 560 located at the external location 545 by out of date with the audit log hash 535 stored on the storage array 505. This may occur in the case where the audit log hash 560 was created at a particular point in time. Subsequently, additional key events 520 are logged and appended to the storage array's 505 audit log file 515. Because the files are no longer identical, a hash of the storage array's 505 audit log 515 would be different that a hash of the external location's 545 audit log 555. To account for such situations, an audit log corresponding to the particular entries in the external location's 545 audit log 555 may be generated 'on-the-fly' by including a subset range (e.g., a date range) in the request directed to the storage array 505.

The audit log 555 may be verified by comparing the audit log hash 560 that accompanied the audit log 555 with the audit log hash received from the storage array 505 as a result of a request to regenerate an audit log hash for a particular range. A user may also rerun the hash function against the audit log 555 and compare it to the local audit log hash 560.

Thus, the user can verify that the audit log that was used to show the occurrence of a particular key event occurred on the storage array in question and that the audit log file has not been tampered with or otherwise modified or altered. For example, if a particular encrypted drive was removed from the storage array 515, some compliance policies or procedures require the missing drive's encryption key be deleted. Employing the techniques described herein, a user can demonstrate that the drive's associated encryption key was deleted by presenting and verifying the audit log to show a key deletion event for the particular drive occurred.

Furthermore, such techniques prevent a user from modifying or fabricating made-up key event entries because each key event's corresponding signature in conjunction with the SSV and audit log hash can be used to verify the key event was generated on the storage array in question.

Figure 6:
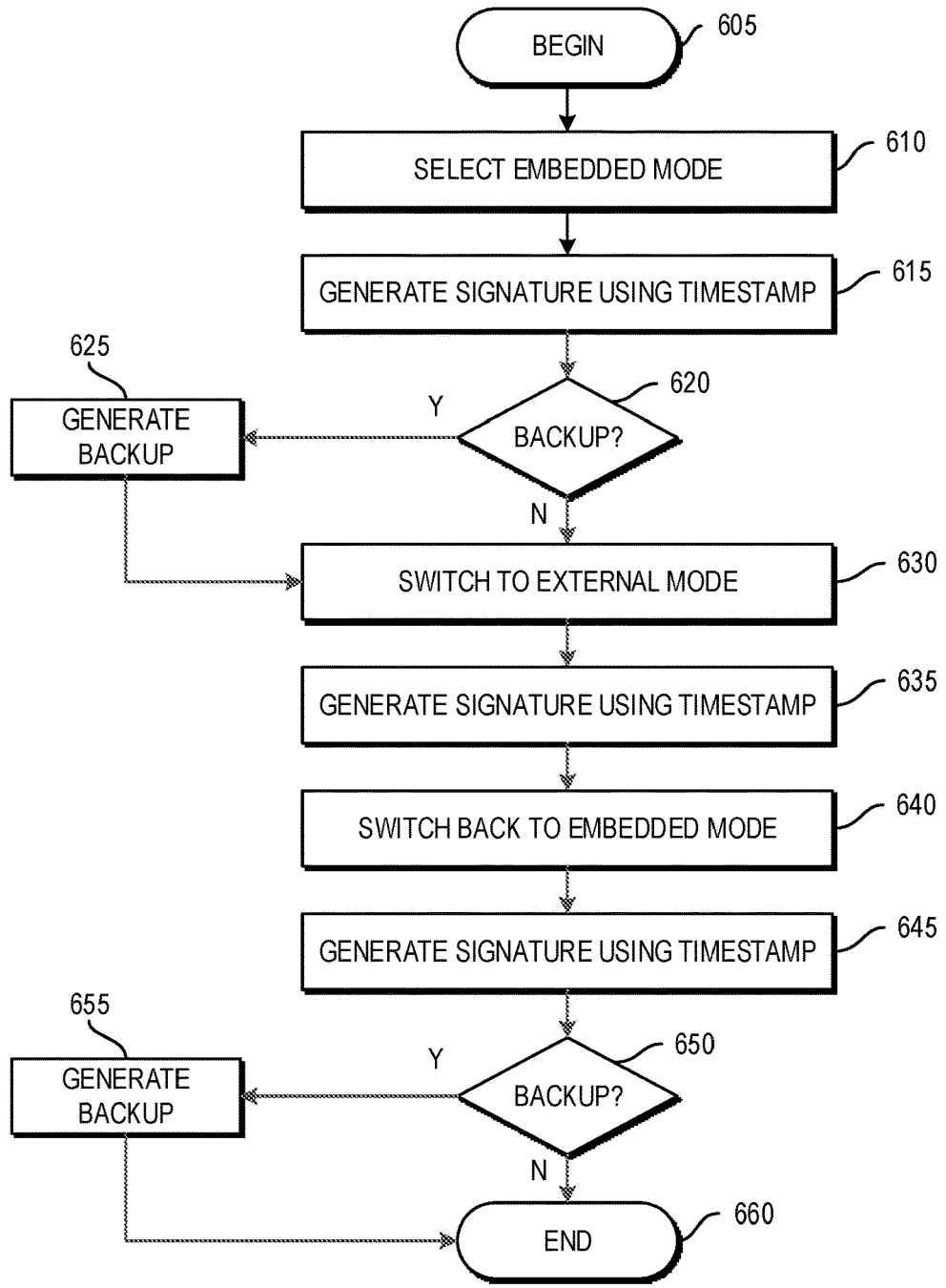
FIG. 6 is a flowchart of a method that may utilize the techniques described herein.

FIG. 6 illustrates an example embodiment of a technique for providing a mechanism to manage switching back and forth between an embedded mode key manager and a remote key manager. The embedded key management solution described elsewhere herein stores drive keys in a lockbox that is stored locally on the storage array. Users vary in their approach to key management where some prefer using an external key management server, other prefer local (also referred to as "embedded") key management using a locally stored and managed lockbox, and still other may prefer to switch back and forth as needs, policies and management practices dictate. The current technique allows the use of both local and external key managers. Further, the current techniques provide the ability to repeatedly switch back and forth between embedded and external key managers while providing seamless creation of corresponding, temporarily referenced keystore signatures and corresponding lockbox backups. Such keystore signatures and lockbox backups prevent unauthorized access should a malicious user attempt to gain access to the storage system using stale/invalidated lockboxes. By contrast, conventional methods do not allow multiple, repeated switching, for example, switching from embedded to external back to embedded key management while creating corresponding, temporal, tamper resistant backups.

As will be described below in further detail, when the system boots up, it reads the keystore header to determine if the encryption keys need to be retrieved from the server and if so, retrieve them from the external key server using, otherwise, local mode is enabled and the keys are managed locally using the lockbox stored locally in a keystore LUN of the storage array (e.g., on system drives). The storage system may communicate with an external key manager using, for example, key manager interoperability protocol (KMIP) or similar suitable communication mechanism. Since the lockbox can be backed up (and restored via the backup if need be), a minimum revision check mechanism is also included in the header in order to prevent a malicious user from backing up a stale/invalidated lockbox. Thus, any restore of a lockbox created before the minimum revision check value is prohibited. In this way upgrades may be supported as well as preventing an old/stale/invalidate lockbox from being restored. To switch modes, for example from embedded to external, a user initiates a command indicating the mode change request, the existing lockbox is updated by creating a keystore header indicating which key management scheme is in use along with a timestamped signature, and key management is then performed by the external key manager.

Referring to FIG. 6, shown is a flow diagram that illustrates an example method for use in implementing techniques described herein for managing embedded and external key management systems. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step 605. The method can be configured to run on boot up using a default mode setting or based on the current setting in a keystore header entry as described below. The setting may be a switch separate from or part of the keystore header entry. Alternatively, or in addition, the method may be initiated manually by service personnel or a user, for example, selecting a mode by clicking on a button or other object in a graphical user interface (GUI) associated with a management system or by entering a command in a command-line-interface, or as embedded in other software. Alternatively, or in addition, some or all of the steps may run in unattended mode as part of system operating or application software or the like. Execution of the method can also be based on various user and/or system specified parameters.

At step 610, a user may, for example, select embedded mode operation where local key management is enabled and a lockbox is stored on a local keystore LUN and operated in a manner as was described elsewhere herein. At step, 615, the method generates a signature by obtaining a timestamp and generating a random value. The random value may be derived using a random number generator such as the RSA® BSAFE® toolkit, provided by RSA Security, LLC, of Bedford, Mass. The timestamp and the random number are then hashed to create a signature such that the signature can be validated to ensure it has not been tampered with. A switch indicating whether embedded or external management mode is selected/enabled may also be created and can be part of, or separate from, the signature. The derived signature is written as a header entry in a local keystore that includes the lockbox.

At step 620, a user may optionally initiate a local backup, and if so, the method proceeds to step 625, and generates the lockbox backup and proceeds to step 630. The backup may be stored locally or remotely in a manner as was described elsewhere herein and the method proceed to step 630. If a backup is not created, the method proceeds to step 630 where key management mode gets switched. In this example, a user or system process initiates a command causing embedded mode to change to external mode such that key management is performed and managed using an external key server. At step 635, a new signature is generated just before, simultaneously, or just after switching to external mode. The signature is generated in a manner similar to that used for embedded mode: a timestamp is derived, a random value generated, and a hash of the timestamp and random value is used to create a new signature. The mode switch value is also set accordingly. The new signature is copied to the keystore header, overwriting the previous signature value. Because the signature is based on a timestamp, any signature created before the timestamp used to create the latest signature is invalidated and, as a result, the previous lockbox backup cannot be restored thereby preventing access to the system encryption keys.

At some later time, the user may decide to switch from external key management back to embedded key management. In this case, at step 640, the user initiates an action effectuating a change back to embedded key management mode. At step 645, a new signature is generated using a new timestamp and new random value, the values are hashed to create a new signature, and the new signature is written to the keystore header. At step 650, the user may again decide to create a backup of the new lockbox, and if so, a backup is generated at step 655 and the method then proceeds to step 660. If not, the method proceeds ends at step 660, where the system may continue operate using the current key management mode, or alternatively, may loop back to a mode change such as that of step 630 and so on.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The techniques described herein may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The block diagrams and flowchart in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing embedded and external key management systems in a data storage system, the method comprising:
   selecting an embedded encryption key management system;

generating a first unique signature for use with a local lockbox, wherein the signature generated using a time parameter and a randomly generated value;

generating, via data storage system processing circuitry, a minimum number of unique data storage system values, the unique data storage system values associated with the data storage system, creating a backup copy of the lockbox and storing the backup copy of the lockbox in a local keystone LUN (logical unit number), wherein access to the backup copy of the lockbox requires providing the minimum number of unique data storage system values;

switching to an external encryption key management system;

generating a second unique signature for use with the local lockbox, wherein the signature generated using a time parameter and a randomly generated value;

switching to the embedded encryption key management system; and generating a third unique signature for use with the local lockbox, wherein the signature is generated using a time parameter and a randomly generated value.

2. The method of claim 1, wherein the signature is hashed.

3. The method of claim 1, wherein the time parameter is a timestamp generated at the time a unique signature is generated.

4. The method of claim 1, wherein a signature generated prior to the most recently generated signature is invalidated.

5. The method of claim 1, wherein a backup associated with a signature generated prior to the most recently generated signature is invalidated.

* * * * *